Figure 1:
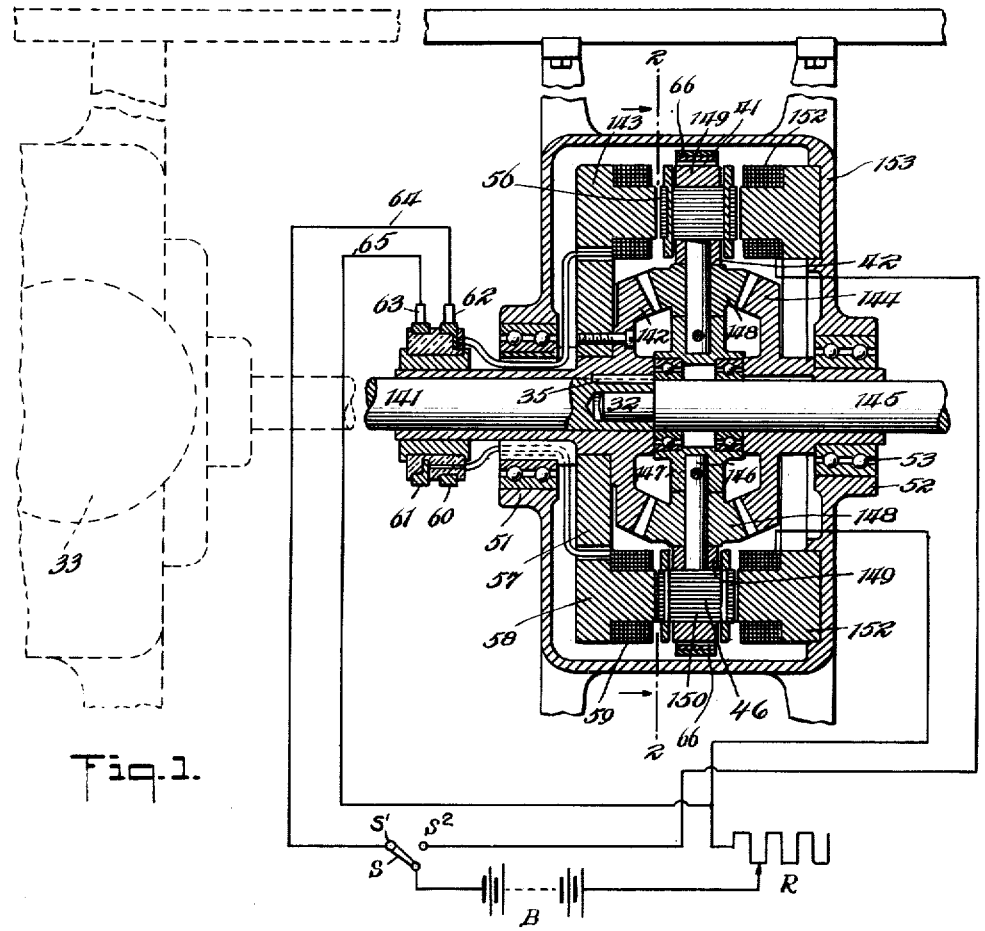

Dec. 4, 1923.

H. J. MURRAY

POWER TRANSMISSION

Original Filed July 11, 1916

1,476,458

INVENTOR
Howard J. Murray
BY
Messmer and Austin
ATTORNEY

Patented Dec. 4, 1923.

1,476,458

UNITED STATES PATENT OFFICE.

HOWARD J. MURRAY, OF NEW YORK, N. Y.

POWER TRANSMISSION.

Original application filed July 11, 1916, Serial No. 108,587. Divided and this application filed April 15, 1919. Serial No. 290,153.

*To all whom it may concern:*

Be it known that I, HOWARD J. MURRAY, a citizen of the United States, and resident of New York city, in the county of Kings and State of New York, have invented certain new and useful Improvements in Power Transmission, of which the following is a specification.

My invention relates in general to a flexible power transmission and control mechanism and specifically relates to a device for selectively securing different speeds and torque values from a constantly driven variable speed power member.

The present application constitutes a division of my copending application on power transmission, No. 1,359,616, patented November 23, 1920.

One of the objects of my invention is to provide a simple form of dynamo electric machine designed first, to effect electrically the transmission of power from a driving member to a driven member, under such conditions that the torque and speed of the driven member may be varied at will to assume any required condition without varying the torque of the driving member; second, to vary at will the speed and torque ratio while transmitting power from a driving member to one or more driven members, and to economically increase or decrease by electrical means the power imparted to the driven member or members without affecting the power delivered by the driving member; third, to vary at will the speed and torque ratio while transmitting power from a driving member to two or more driven members, and to permit variation of the speed and torque ratio of the driven members with respect to each other, and to the speed and torque ratio of the driving member; fourth, to transmit power from one member to another member under such conditions that either member may become the driving member, while the other member becomes the driven member; fifth, to transmit power from a driving member to a driven member under such conditions that the speed and torque ratio of the driven member may be varied to approach and equal the value of the speed and torque ratio of the driving member, and to mechanically connect the driven member and the driving member for direct transmission of power when the speed and torque ratios of the members do approach or equal each other; sixth, to provide a sensitive and flexible form of electrically energized controlling organization for automatically and promptly effecting variations in the speed and torque ratios between the driving and driven members, with a minimum loss of energy in effecting said variations.

In devices of this character as hereinbefore known in the art, the armature carrying the inductors is rotated in the same direction as the field producing means, and the transmission of power from the driving to the driven member depends on the "slip" or difference of speed between the armature and the field producing means.

In one physical embodiment of my invention, I broadly attain the transmission of power by connecting the member carrying the inductors, with the driving member so that the inductors will be rotated mechanically in a direction opposite to the direction of rotation of the driving member. Thus the inductors are rotated in a direction opposite to the direction of rotation of the field producing means which is mechanically connected to the driving member, thereby giving a large "slip" value, or a greater difference of speed between the inductors and the field producing means, when compared to the "slip" or difference of speed created when revolving the armature and field producing means in the same direction. In the specification and claims the term "inductor" or "inductor rotor" is used to designate an element in electro-dynamic inductive relation to a field element.

The invention also contemplates the use of a dynamo-electric machine including means either stationary or mounted for rotary movement designed to generate a magnetic field in which an armature or rotor carrying inductors forming part of a closable circuit or circuits, is mounted for rotary movement in a direction opposite to the direction of rotation of the driving member.

Another object of the invention is to provide in a machine of the class defined, a form of machine in which two field producing means are employed, one fixed and one attached to the driving member and further to provide a form of machine which is reversible.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

Figure 2:
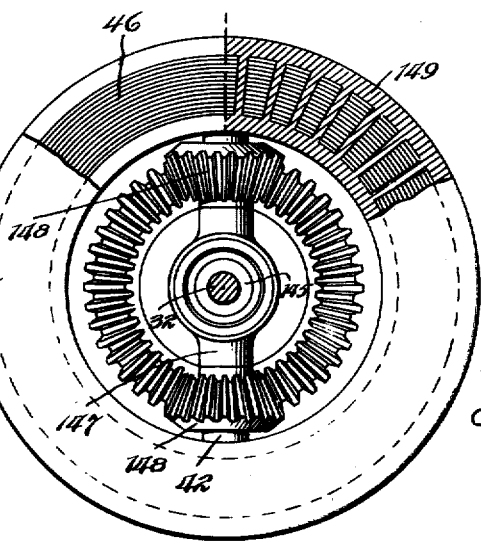

Referring to the accompanying drawings:

Figure 1 is one physical embodiment of my invention in vertical section taken axially of the main drive and driven shafts and shown connected to an electric circuit shown diametrically; and Figure 2 is a transverse sectional view taken on the line 2—2 of Figure 1.

In the following description and in the claims, parts will be identified by specific names for convenience of expression but they are intended to be as generic in their application to similar parts as the art will permit.

Referring to the embodiment of the invention disclosed, there is shown a dynamo electric machine constituting a driving transmission and including a pair of shafts 141 and 145 disposed in axial alignment and with their adjacent ends interfitting to provide a mutual bearing 32. The shafts are mounted for independent rotary movement respectively in bearings hereinafter more particularly described and while either one of these shafts may be considered as the driven or as the driving member of the transmission, for the purpose of this description, it will be considered that the shaft 141 is the driving member and is operatively connected to be driven from a source of mechanical power, such as an internal combustion engine 33 or other suitable prime mover, shown in dotted outline.

Accordingly, shaft 145 is regarded as the driven member and is operatively connected to whatever mechanism (not shown) is designed to be driven from the prime mover.

Connecting the contiguous ends of the shafts is a differential bevelled gear train set formed of at least three gears meshing in order. The first gear 142 may be regarded as a driving gear as it is fixed by means of the key 35 to the shaft 141 so as to rotate about the axis thereof. The other two gears of the train may be regarded as driven gears with the end gear 144 keyed to the shaft 145 and with the teeth thereof facing the teeth of the gear 142. Both of the gears 142 and 144 are continuously in mesh with the intermediate gear 148 of the train. This gear 148 resembles the idler gear in the usual mechanical differential gear sets and likewise is mounted free to rotate about the axis of a transverse shaft 146 extending at right angles to the aligned axes of the shafts 141 and 145. The shaft 146 is loosely mounted upon and extends at right angles to the main shafts 141 and 145 and is free to revolve about the axis of these main shafts. Instead of a single intermediate gear connection between the gears 142 and 144, preferably two or more such gears are used, as shown, in order to minimize distortional strains on the shaft, but it is obvious that any number of intermediate gears may be positioned between the facing gears in order to drive one from the other. The differential set and parts connected therewith are contained within a casing or frame 153 opposite sides of which are provided with cylindrical extensions 51 and 52 within which the shafts 141 and 145 are respectively centered. The extensions contain ball bearing mountings 53 for the portion of the driven and driving shafts which extend into the casing.

Rigidly fixed to the driving gear 142 is a magnetic field producing member 143 mounted to face the rotor 149 with the least possible air gap 56 therebetween. This member is formed of a disk shaped back plate 57 which tends to reinforce the gear centered in the face thereof. A plurality of circumferentially spaced pole pieces 58 extend inwardly from the back plate 57 adjacent its periphery and project from the inner face thereof close to the face of the rotor. These pole pieces are preferably positioned as close together as their windings will permit and form a ring of pole pieces encircling the gear 142. Each of the pole pieces is wound with a conductor 59 constituting a field winding, the ends of which are connected to the sections of a conventional form of slip rings. Current may be conveyed to or taken off the slip rings 60 and 61 and brushes 62, 63 to which are connected lead wires 64, 65. While it is obvious that the field winding conductors 59 may be energized electrically in different ways, let it be assumed in discussing one way in which the device may be arranged for use, that the circuits through the rotor inductors are closed on themselves, thus forming inductors when influenced by the field produced by the rotating member 143. The field windings may be positioned in a circuit which includes a source of energy such as a storage battery "B" and if desired a suitable rheostat "R" may also be included in the circuit to regulate the current strength through the field windings. The shafts 146 project outwardly beyond the gears 148 and carry a circular frame 149 constituting part of an A. C. rotor.

The rotor is a casting including a pair of concentric rings 41 and 42. Laminations 46 formed preferably of closely positioned thin iron sheets extend circumferentially of the rotor and are positioned between the rings as is usual with A. C. rotors of the ring type inductors. The armature inductors 150 and the inductor current rings 41 and 42 are preferably a one-piece casting of any proper current conducting material, cast after the laminations 46 have been assembled.

A stationary field producing means 152 similar to the revolving field producing means 143 is rigidly attached to the frame 153 enclosing and supporting the shafts 141 and 145. A mechanical brake such as is shown at 66 and preferably of the clutch band type may be positioned to encircle the rotor and to act when in operative position to hold the shafts 146 from revolving and thus holding the axis of rotation of the gears 148 while permitting these gears to rotate.

In operation it will be obvious that the revolving field when energized by the source of power B, and controlled by the resistance R will drag the inductors of the frame 149 with it, and thus drive the driven shaft 145 through the gear 144.

By throwing the control switch S from point S' to S² the stationary field 152 will be energized and thus retard the rotor 149, and the driven shaft 145 will be rotated in the opposite direction by the action of the intermediate gear 148 on the driven gear 144, or there will be produced a reversible electric transmission system with no change of gears.

With the switch S open, the brake 66 may be applied to hold the rotor 149 from revolving. The driving shaft 141 will then rotate the gear 142, and acting through the gears 148 and 144 rotate the driven shaft 145, thus providing a direct mechanical drive between the shafts.

While I have shown and described, and have pointed out in the annexed claims, certain novel features of my invention, it will be understood that various omissions, substitutions and changes in the form and details of the device illustrated and in its operation may be made by those skilled in the art without departing from the spirit of the invention.

Having thus described my invention, I claim:

1. In a device of the class described, the combination with a pair of shafts, and a driving connection therebetween, of an electrically energized control mechanism including a pair of magnetic structures each providing a flux path, one of said structures fixed in place and the other mounted on one of the shafts to rotate therewith, a single inductor for said structures carried by the driving connection, and operatively connected to the other shaft and free to move relative to both shafts, and means for producing a magnetic flux selectively in either structure.

2. In a device of the class described, the combination with a pair of shafts of a gear set mechanically connecting the shafts, two magnetic structures each providing a flux path, means for selectively producing magnetic flux in either of said paths, an inductor rotor coacting with said structures controlled by said flux paths and operatively associated with said gear set to control the rotation of certain elements thereof and thus control the speed relation between the shafts.

3. In a device of the class described, the combination of a driving shaft, a differential gear set having one of its end gears operatively connected to be driven from said shaft, a driven shaft operatively connected to the other end gear of the set, an inductor rotor operatively connected to be actuated by the revolving movement of the intermediate gear of the differential gear set and to revolve said intermediate gear, a pair of field structures actively disposed in spaced relation to the rotor, one of said structures connected to one of the shafts and the other structure fixed in place.

4. In a device of the class described, the combination of a driving shaft, a differential gear set having one of its end gears operatively connected to be driven from said shaft, a driven shaft operatively connected to the other end gear of the set, an inductor operatively connected to be actuated by the revolving movement of the intermediate gear of the differential gear set, a pair of field structures coactively associated with the rotor, one of said structures connected to one of the shafts and the other structure fixed in place and mechanism for energizing either of said structures, said structures wound relative to the inductor whereby energizing one of the structures with the driving shaft turning in one direction will cause the driven shaft to turn in the same direction and energizing the other structure will similarly cause the driven shaft to turn in the reverse direction.

5. In a device of the class described, the combination of a driving shaft, a differential gear set having one of its end gears operatively connected to be driven from said shaft, a driven shaft operatively connected to the other end gear of the set, an inductor operatively connected to actuate or to be actuated by the revolving movement of the intermediate gear of the differential gear set, a pair of field structures coactively associated with the rotor to exert a magnetic clutching effect thereon while permitting relative movement, one of said structures connected to one of the shafts and the other structure fixed in place, mechanism for energizing either of said structures, said structures wound relative to the inductor whereby energizing one of the structures with the driving shaft turning in one direction will cause the driven shaft to turn in the same direction and energizing the other structure will similarly cause the driven shaft to turn in the reverse direction and means for controlling the strength of the fields produced by the structures thereby to vary the speed ratio of the shafts.

6. In a device of the class described, the combination with a driving mechanism, a driven mechanism and a reversible driving mechanical connection between said mechanisms, of a non-friction magnetic clutch including an inductor operatively connected to one element of the mechanical connection to control its speed, a fixed field producing means coacting with said inductor to form a non-friction magnetic brake and control means for said clutch and brake to effect at will either a forward or a reverse drive of the driven mechanism from the driving mechanism.

7. In a device of the class described, the combination with a driving member, and a driven member, of a driving connection between said members, said means including a differential gear set with the end gears thereof operatively connected to said members to drive one from the other, a rotor inductor carried by the intermediate gear of said set, means for braking said rotor from revolving movement whereby one member is driven mechanically from the other mechanically and electrically controlled means coacting with said rotor for controlling the relative direction of rotation of said members.

8. In a device of the class described, the combination with a driving and a driven member, of a driving gear connection between said members with the gears constantly in mesh and electrically controlled means operatively associated with said gear connection selectively to effect a reverse drive of said driven member at variable speeds and a non-friction magnetic brake for retarding the movement of one of the gears in said gear connection thereby to effect a mechanical drive between the members.

9. In a device of the class described, the combination of a revolving field structure, a stationary field structure, a rotor mounted between said two structures in position to maintain air gaps between said means and the rotor at all times, a differential gear set having its intermediate gear rotatably mounted on said rotor, one of the other two gears fixed to the rotating field structure and the other gear constituting a driven member.

10. In a device of the class described, the combination of mechanism fixed against all movement except rotary movement and including a driving and a driven member, means including constantly meshed gears therebetween for effecting a forward or a reverse rotation of the driven member without change of gears and said means including a non-friction magnetic clutch and a magnetic brake coacting selectively to effect at will a variable speed rotation of the driven member in either direction from a relatively constant speed in one direction of the driving member.

Signed at New York city, in the county and State of New York, this 5th day of April, A. D. 1919.

HOWARD J. MURRAY.